Feb. 6, 1968     P. ODDI     3,368,009
PROCESS FOR MOLDING SYNTHETIC EXPANDED THERMOPLASTIC MATERIAL
Filed June 23, 1965
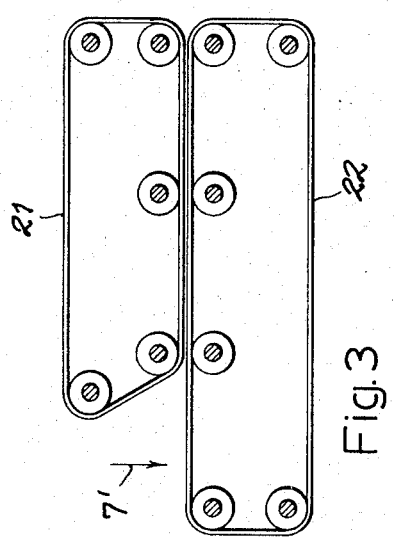
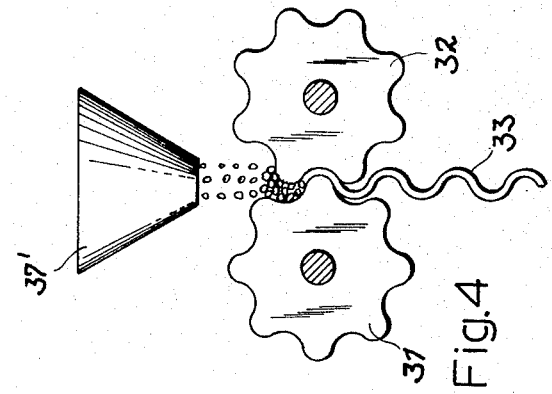
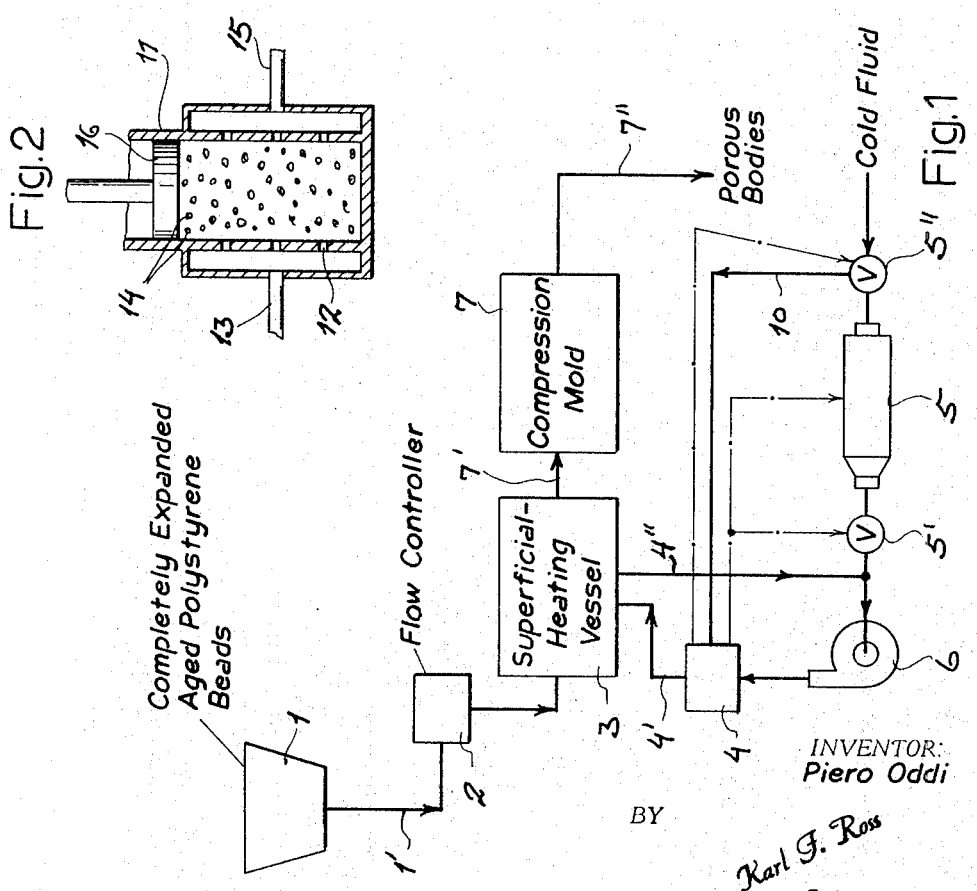
INVENTOR:
*Piero Oddi*
BY
*Karl J. Ross*
Attorney

United States Patent Office 3,368,009
Patented Feb. 6, 1968

3,368,009
PROCESS FOR MOLDING SYNTHETIC EXPANDED THERMOPLASTIC MATERIAL
Piero Oddi, Milan, Italy, assignor to Montecatini S.p.A., Milan, Italy
Filed June 23, 1965, Ser. No. 466,306
Claims priority, application Italy, July 26, 1964, 14,152/64
6 Claims. (Cl. 264—53)

ABSTRACT OF THE DISCLOSURE

Process for making porous cellular styrene bodies wherein noncoherent, completely expanded and aged particles of a thermoplastic resin consisting of at least 50% by weight chemically combined styrene are heated only superficially (i.e. to a depth of at most the order of 0.01 mm. when the particle size is 0.15 to 5 mm.) at a temperature of 10 to 80° C. above the softening point of the resin for a period of 0.1 to 20 seconds and yet insufficient for general melting of the particles, and only thereafter compressing the particles to bond them together along superficially heated regions. The particles are superficially heated by a treatment with hot gas at a temperature of 120 to 150° C. and compressed after this superficial heating by a pressure of 0.1 to 1 kg./cm.$^2$.

My present invention relates to improvements in the molding of expanded thermoplastic materials of the type in which an expanding medium serves to increase the volume of thermoplastic bodies upon elevation of temperature.

Expandable thermoplastic synthetic resins have, of late, come into general use for all types of bodies capable of utilizing the cellular characteristics of the molded articles; thus, expandable-polystyrene receptacles are used for the storage of refrigerated goods and for retention of hot substances, the expanded-resin layer being characterized by a low thermal conductivity. The expanded-thermoplastic material is used in sheet form as an insulating lining and can be molded into various shapes to take advantage of its excellent flotation, its relatively high mechanical strength and its pleasing appearance. Typical shaped bodies formed from expanded thermoplastics includes boat hulls, articles of furniture, packing cases, and toys.

In general, the processes for molding expandable thermoplastics require the following steps:

(a) Pre-expansion of the beads of the thermoplastic material (e.g. polystyrene) which have previously been provided with an expanding medium vaporizable at the pre-expansion temperature. In this step, the unexpanded beads, pellets or particles, which are impregnated with or have otherwise absorbed the expanding medium, are subjected to a heating fluid to partially volatilize the expanding medium.

(b) Aging the pre-expanded beads to prevent shrinkage when the latter are subsequently molded. The term "pre-expanded" is used by the art to designate those beads whose volumes have been increased. "Partially expanded" beads are those whose volume has been increased to a point less than their maximum degree of expansion and which are capable of further expansion upon an additional heating treatment. In general, partially expanded beads are employed for molding in conventional processes because of the difficulties in handling totally unexpanded particles. The term "completely expanded" will be used herein to designate those beads which have been subjected to heat treatment for a period and at a temperature such that no material further increase in volume will occur with continued treatment. These terms, while relative, have attained definite meaning within the art and are in common use in connection with expandable, partially expanded and completely expanded thermoplastic resins, especially polystyrenes.

(c) The pre-expanded and aged beads, which are usually only partially expanded, are then introduced into a preheated mold form which is then closed and subjected to further heating to sinter or thermally fuse the beads within the mold form; for the most part, the mold is apertured to permit access of the heating fluid to the beads therewithin from a steam chest or the like surrounding the mold. When the beads are only partially expanded prior to introduction into the mold, they expand further against the walls thereof.

(d) The mold containing the shaped cellular thermoplastic body is then cooled and, upon cooling, the body is removed therefrom. The gradual cooling of the mold is essential to proper operation of the process since the mold can be opened only after the temperature of the body has become uniform throughout; otherwise, undesirable deformation of the molded body results. The cooling of the mold containing the shaped body requires, in most cases, a period of substantially 70–80% of the entire molding cycle. For this reason, the processing costs and time are primarily dependent upon the prolonged period required for cooling the mold. It is, moreover, almost impossible to carry out the molding process in a continuous manner by these conventional techniques since the long time in which the mold must remain closed during cooling precludes any continuous or high-rate re-use of these molds.

It is, therefore, an important object of the present invention to provide an improved process for the molding of thermoplastic particles to produce expanded-resin bodies at lower cost and with greater efficiency.

Another object of my invention is the provision of a process for molding thermoplastic particles whereby the disadvantages of earlier systems can be obviated and the principal time-consuming step, namely the cooling of the mold, is eliminated or sharply shortened.

Another object of this invention is to provide an apparatus for carrying out the improved process.

These objects and others which will become apparent hereinafter are attained, in accordance with the present invention, by a process based upon my discovery that the long-duration cooling of a mold for the shaping of expanded-thermoplastic beads or particles can be sharply reduced by a heating of the completely expanded particles to a temperature above their softening point for a relatively short period such that only a superficial softening of the particles is effected, and thereafter or concurrently compressing the particles to the desired dimensions of the final shape. This result is indeed remarkable since the process is found to yield porous bodies with low apparent density in spite of the fact that temperatures above the softening point are used and the particles are compressed. It may be theorized, although I do not wish to be bound by any theory, that the completely expanded particles are softened only in a surface zone of relatively small depth so that a compression of the particles within the mold, upon such superficial softening, causes intercontacting particles to fuse together without condensing or coalescing more than to the depth of the superficially melted surface layer. The superficial heating of the particles does not require thermal equilibration within the mass of the shaped body so that the cooling of the mold containing the latter can be carried out in a considerably shorter time than has been possible heretofore, thereby leading to an increase in the rate of production.

According to a more specific feature of the present invention, completely expanded particles of a thermoplastic resin, aged to prevent shrinkage, are subjected to a superficial heat-treatment with a heating fluid at a temperature from substantially 10° to 80° C. higher than the softening temperature of the synthetic resin for a treatment time ranging between substantially 0.01 and 20 seconds, depending upon the physical properties of the thermoplastic substance. I have found that it is best that the temperature and duration of heating be regulated so that the superficial softening is limited to a layer having a depth of at most on the order of 0.01 mm. The product resulting from the compression of the superficially softened particles or beads is surprisingly resistant to crumbling and has physical properties greater than or comparable with those of conventionally produced articles.

The molds with which the present invention is operable will, of course, have relatively movable wall portions functioning as pistons or compression members to permit the compaction of the pellets upon their superficial softening. Suitable molds include chambers provided with a multiplicity of fixed walls and at least one piston-like movable wall, pairs of conveyor belts sandwiching the superficially heated expanded beads between them, and pairs of suitably shaped (e.g. corrugated) rollers. Advantageously, the mold should be provided with apertures designed to admit a heating fluid to the interior of the mold for direct treatment thereby of the expanded thermoplastic particles; I have found that, when the mold includes a three-dimensional chamber, it is particularly advantageous to supply the heating fluid at a velocity and pressure sufficient to cause mechanical entrainment of the particles by the fluid so that a turbulent or agitated random movement of the particles in the whole of the chamber results during compression. A greater uniformity of the finished body is noticeable in this case. It has been observed that the mold-cooling time of the system of the present invention ranges from zero to several tens of seconds by comparison with cooling times, in conventional systems, greater by several orders of magnitude. While substantially all types of completely expanded thermoplastic particles (in which expansion has been carried out by the heating of particles containing an expanding medium) can be employed, it has been found that best results are obtained when the thermoplastic prior to the incorporation of the expanding medium therein is a polymer formed from a monomer mixture containing at least 50% by weight styrene. Suitable expandable thermoplastic materials are those described, for example, in U. S. Patents Nos. 2,744,291 and 2,787,809 and others of this class. Thus, volatile liquids such as pentane, hexane, and petroleum-ether fractions with boiling points between substantially 25° and 100° C. can be used as expanding media, alone or in combination. Gases (at ambient temperature) can also be employed. Propane, butane, chlorinated hydrocarbons, fluorinated hydrocarbons and chlorofluoro derivatives of lower aliphatic hydrocarbons may be specifically mentioned as operable in this regard. All of the other expanding agents mentioned in the above-identified patents and used in common practice by those skilled in the art can also serve.

The complete expansion of the expandable particles, especially expandable polystrene, is preferably carried out by immersing the beads in hot water at a temperature of about 90° C. (when the expanding medium has a boiling point below this temperature) or by subjecting the beads to treatment with a hot fluid such as steam, air and other gases at a temperature above the boiling point of the expanding medium. High-frequency electrical heating and infrared heating may also be employed. During the complete expansion of the particles, they are advantageously kept in continuous turbulent movement to avoid agglomeration; after total expansion, the particles, freed from the expanding medium, are aged for a period ranging from substantially three hours to substantially 72 hours, and preferably between 6 and 48 hours. The aging step permits air to enter the completely expanded particles to replace volatile constituents driven therefrom at the elevated pre-expansion temperature, thereby obviating shrinkage in the molded body.

The superficial heating of the present invention is then carried out with the most satisfactory mode of operation involving the treatment of the particles with hot air at a temperature of substantially 120° to 160° C. for a period of the order of several seconds to soften the particles, which preferably have diameters within the range of 0.15 to 5 mm., to a depth of the order of 0.01 mm. (maximum). The pressure employed for compacting the particles into the molded body will advantageously range between substantially 0.1 and 1 kg./cm.$^2$. Pressures in this range yield molded bodies with low apparent density, high resistance to crumbling and excellent appearance. Higher pressures can be employed to give bodies with higher apparent densities and greater strength.

The above and other objects, features and advantages of the present invention will become more readily apparent from the following description, reference being made to the following specific examples, representing the best modes presently known for taking advantage of the invention, and the accompanying drawing in which:

FIG. 1 is a flow diagram illustrating an apparatus for practicing the process of the present invention; and FIGS. 2 through 4 are diagrammatic cross-sectional views showing various molding devices for use in the system of FIG. 1.

In FIG. 1, I show a hopper 1 containing a supply of completely expanded and aged polystyrene particles produced as described hereinafter with reference to Examples I and II and/or any of the specific examples of the aforementioned U.S. patents. The completely expanded and aged beads are led via a line 1' and a flow-control device 2 to a treatment chamber 3 in which the beads are subjected to treatment by a hot fluid for a limited period of time just sufficient to soften a surface layer of beads. The flow-control device can be any of those conventionally employed for this purpose including metering-type conveyors and dispensing devices. The heating fluid is supplied to the vessel 3 via a line 4' and a temperature-control device 4 which, in response to the temperature of the fluid, operates a heating muffle 5 and a valve 5' to control the rate at which additional heating fluid is fed to the system by a blower 6 and the temperature of this additional fluid. A line 4" returns thermally-depleted heating fluid to the recycling means 6. After superficial heating in vessel 3, as will be described in greater detail in specific Examples I and II, infra, the beads are placed in a mold 7 in which compression takes place. It will be understood that the superficial heating can be carried out in the mold instead of a separate vessel 3 although the latter is of advantage when continuous "molds" are employed. The arrow 7' can thus represent a means for continuously supplying the superficially heated beads to the continuously operable mold. Upon discharge from the compression mold, the porous body can be removed as diagrammatically illustrated at 7". A further valve 5" at the cold-fluid inlet of the heating muffle 5 is also controlled by the temperature regulator 4 in the event it is desired to feed cool fluid to the system via a line 10.

In FIG. 2, I show a generally cylindrical mold 11 for the production of cylindrical bodies in which the lateral walls are perforated at 12 and are supplied with the high-velocity heating fluid at 13, for maintaining a turbulent movement among the superficially heated expanded polystyrene beads 14 within that mold. The depleted heating fluid is led at 15 from the mold while a piston 16 forms a movable wall and serves to compact the superficially heated beads. A mold of this type is, of course, intended to be represented by the compression mold 7.

In FIG. 3, I show a pair of continuously movable belts 21, 22 which are perforated to permit the passage of a heating fluid between them, if the particles continuously supplied via line 7' to the lower belt 22 require further heating to soften their surface layer. The pellets are compressed between the contiguous surfaces of the belts to yield a continuous sheet of expanded polystyrene.

In FIG. 4, a pair of profiled corrugated compression drums 31, 32 form the mold, and a hopper 37' feeds the superficially heated beads between these rollers to yield the continuous corrugated sheet 33. The "molds" of FIGS. 3 and 4 can, of course, be used with the system of FIG. 1 at the block identified at 7 for continuous molding of expanded styrene.

*Example I*

Polystyrene beads prepared in accordance with the above-identified U.S. patents and rendered expandable by adding a gaseous expanding agent to an aqueous expansion of the polystyrene beads were subjected to a prolonged treatment with steam for a period sufficient to obtain complete expansion. The particles were aged for 24 hours and had a particle size (diameter) of substantially 0.15 to 5 mm. These particles were placed in a cylindrical vessel (e.g. that shown at 11 at FIG. 2) having a piston shiftable in the vertical direction. On the lateral surfaces and the bottom of the vessel hermetically closable openings were provided for introducing the expandable particles and for feeding a heating fluid to the vessel and leading the depleted fluid therefrom.

The particles half-filled the mold chamber of the cylindrical vessel and hot air was supplied at a temperature of 128° C. for a period of 10 seconds at a velocity sufficient to entrain the polystyrene particles with the gas and distribute the particles randomly and with turbulent motion throughout the volume of the chamber when the piston was in its upper position. Heating was then terminated and the piston lowered to compress the particles which had previously settled. A compression pressure of 0.1 kg. per cm.$^2$ was applied to the particles for a brief period. After about 1 minute the molded body was removed from the vessel and examined. The density of this porous body was found to be 20 kg. per cm.$^3$ and the body had a resistance to flection of 3.5 kg. per cm.$^2$, a tensile strength of 2.5 kg. per cm.$^2$ and a compressive strength of 2 kg. per cm.$^2$. The thermal conductivity was 0.26 kcal./hr./cm./cm.$^2$/° C. When higher pressures were employed, increasing strength was obtained with a sacrifice of the low apparent density of the body.

*Example II*

The system of Example I was employed with, however, superficial heating taking place at a temperature of 140° and 160° C. with heating times of 9 and 7.6 seconds respectively. Compression at 0.1 kg. per cm.$^2$ yielded shaped bodies whose characteristics were similar to those of the body produced in Example I.

The invention as described and illustrated admits of various modifications within the ability of persons skilled in the art without departing from the spirit and scope of the invention as defined in the appended claims.

I claim:

1. A process for making porous cellular thermoplastic bodies, comprising the steps of superficially heating, in a loose and substantially noncompressed state, completely expanded and aged particles of a thermoplastic resin to a temperature of substantially 10° to 80° C. in excess of the softening point of said resin for a period of 0.1 to 20 seconds but insufficient for a general softening of the particles; and compressing said particles only after the superficial heating thereof in the loose state to bond them together along their superficially heated regions without substantial deformation of said particles.

2. A process as defined in claim 1 wherein said resin consists of at least 50% by weight of chemically combined styrene.

3. A process as defined in claim 1 wherein said particles are heated by circulating among them a hot gas at a temperature ranging between substantially 120° and 160° C. for a period sufficient to soften said particles to a depth on the order of 0.01 mm.

4. A process as defined in claim 1 wherein said particles are compressed after their superficial heating with a pressure ranging between substantially 0.1 and 1 kg./cm.$^2$.

5. A process as defined in claim 1 wherein said particles have a diameter of substantially 0.15 to 5 mm. diameter.

6. A process as defined in claim 1 wherein said particles are heated by being agitated in a hot gas stream within a closed chamber.

References Cited

UNITED STATES PATENTS 2,409,066  11/1946  Powell et al. _____ 264—119
3,255,286  6/1966  Luc-Belmont _____ 264—109

ALEXANDER H. BRODMERKEL, *Primary Examiner.*

L. M. GARRETT, *Assistant Examiner.*

UNITED STATES PATENT OFFICE
CERTIFICATE OF CORRECTION

Patent No. 3,368,009                          February 6, 1968

Piero Oddi

It is certified that error appears in the above identified patent and that said Letters Patent are hereby corrected as shown below:

In the heading to the printed specification, line 5, for "S.p.A., Milan, Italy" read -- Edison S.p.A., Milan, Italy --.

Signed and sealed this 15th day of July 1969.

(SEAL)
Attest:

Edward M. Fletcher, Jr.                     WILLIAM E. SCHUYLER, JR.
Attesting Officer                              Commissioner of Patents